US009438603B2

(12) United States Patent
Nallapa Raju et al.

(10) Patent No.: US 9,438,603 B2
(45) Date of Patent: Sep. 6, 2016

(54) METHOD FOR MANAGING ACCESS RIGHT OF TERMINAL TO RESOURCE BY SERVER IN WIRELESS COMMUNICATION SYSTEM, AND DEVICE FOR SAME

(71) Applicant: LG ELECTRONICs INC., Seoul (KR)

(72) Inventors: Rama Gopala Nallapa Raju, Bangalore (IN); Seungkyu Park, Anyang-si (KR); Seongyun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/420,847

(22) PCT Filed: Sep. 2, 2013

(86) PCT No.: PCT/KR2013/007892
§ 371 (c)(1),
(2) Date: Feb. 10, 2015

(87) PCT Pub. No.: WO2014/038820
PCT Pub. Date: Mar. 13, 2014

(65) Prior Publication Data
US 2015/0207798 A1     Jul. 23, 2015

(30) Foreign Application Priority Data

Sep. 7, 2012   (IN) ............................ 3703/CHE/2012

(51) Int. Cl.
| | |
|---|---|
| *G06F 7/04* | (2006.01) |
| *H04L 29/06* | (2006.01) |
| *H04W 48/02* | (2009.01) |
| *H04W 88/16* | (2009.01) |
| *H04W 4/00* | (2009.01) |
| *H04W 12/08* | (2009.01) |

(52) U.S. Cl.
CPC ............ *H04L 63/101* (2013.01); *H04W 4/001* (2013.01); *H04W 4/005* (2013.01); *H04W 12/08* (2013.01); *H04W 48/02* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 6,947,959 B1* | 9/2005 | Gill | G06F 17/30011 707/999.003 |
| 2001/0020228 A1* | 9/2001 | Cantu | G06F 21/335 705/50 |
| 2009/0203356 A1 | 8/2009 | Li et al. | |
| 2010/0267405 A1 | 10/2010 | Chin et al. | |
| 2011/0196966 A1 | 8/2011 | Chai et al. | |
| 2012/0066367 A1 | 3/2012 | Chai et al. | |

* cited by examiner

*Primary Examiner* — Brandon Hoffman
(74) *Attorney, Agent, or Firm* — Dentons US LLP

(57) ABSTRACT

A method for managing an access right of a terminal to a resource by a server according to one embodiment of the present invention is disclosed, and the method is performed by a gateway device and comprises the steps of: receiving a management command for adding, to a privilege management object (MO), or updating an access control list (ACL) to a resource(s) of a terminal or a terminal group for a secondary server having no access right to the resource(s) from a primary server; making a request for ACL(s) of the resource(s) to the terminal or each of terminals in the terminal group; receiving the ACL(s) of the resource(s) from the terminal or each of the terminals in the terminal group; determining on the basis of the received ACL(s) whether the primary server has permission to perform the management command; and if it is determined that the primary server has permission to perform the management command, adding, to the privilege MO, or updating the ACL of the resource(s), wherein the privilege MO is stored in the gateway device and can include information on an access right of a specific server to a resource of a specific terminal.

10 Claims, 13 Drawing Sheets

FIG. 5
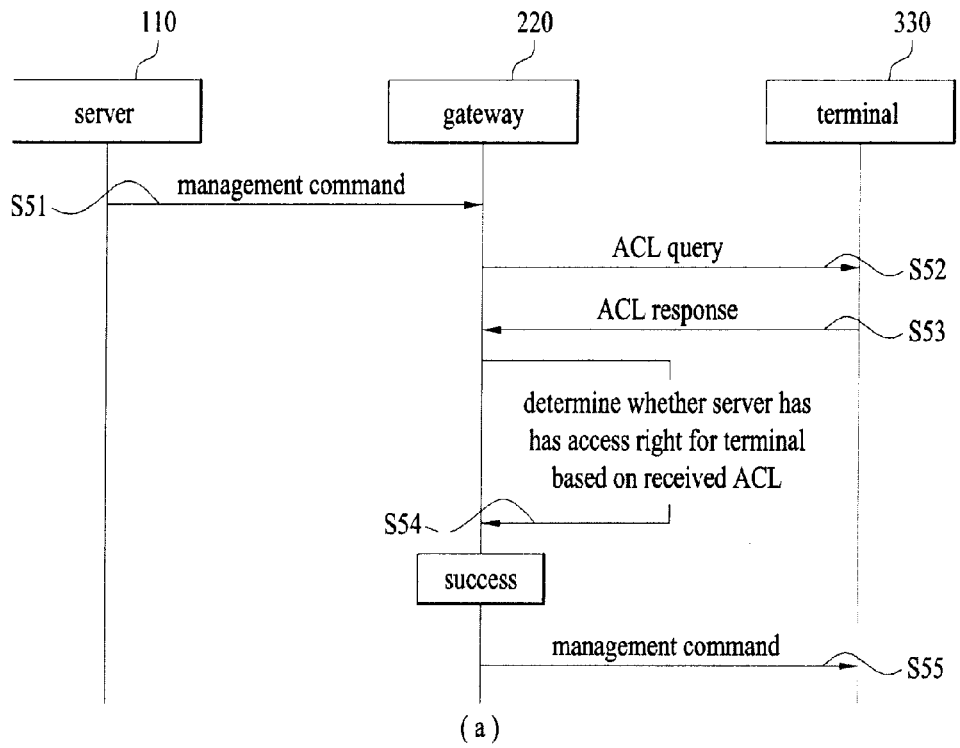
(a)
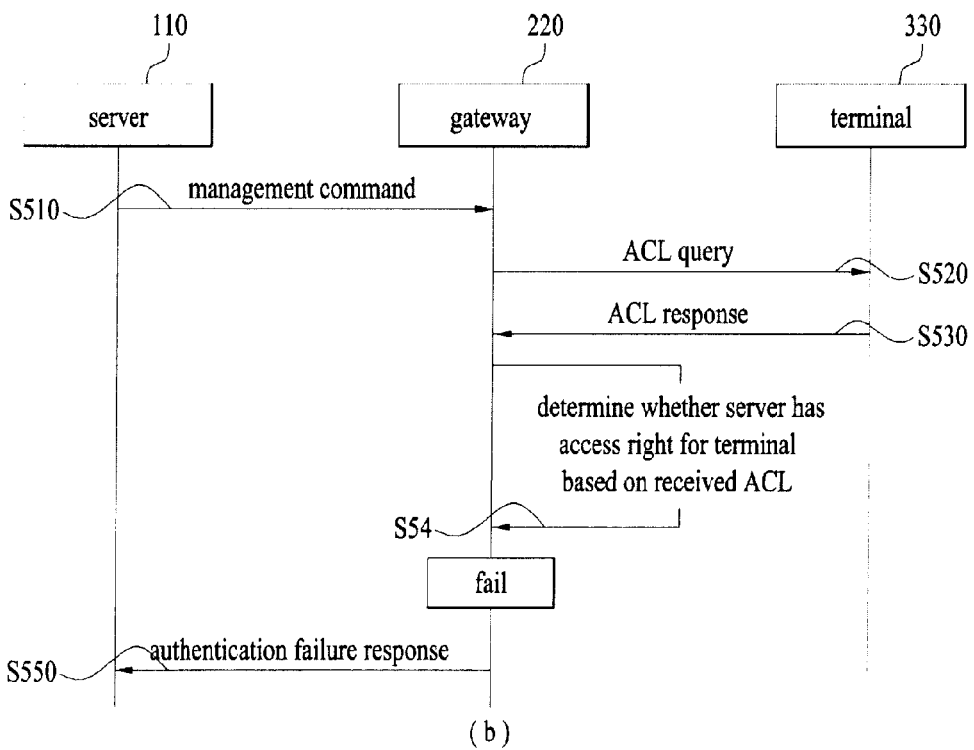
(b)

FIG. 6
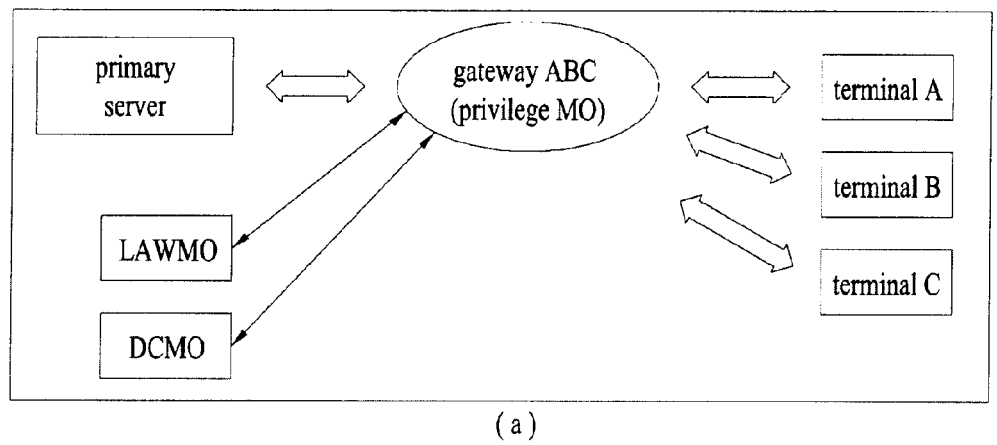
(a)
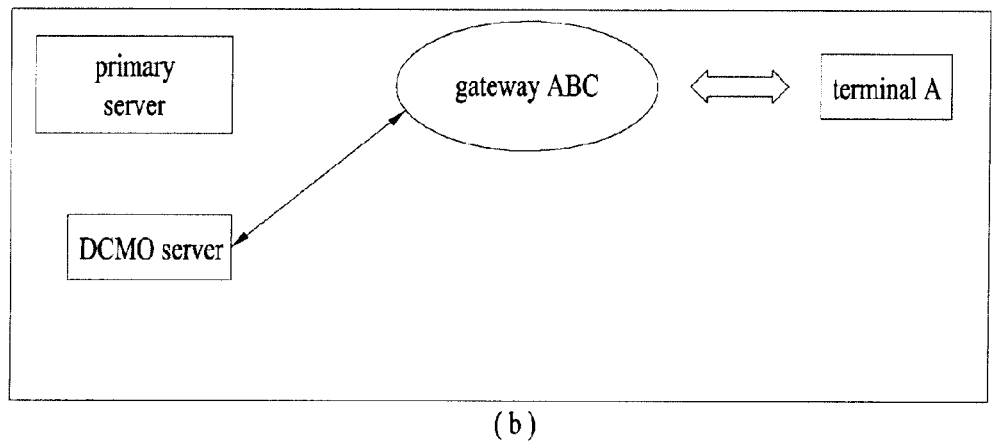
(b)

METHOD FOR MANAGING ACCESS RIGHT OF TERMINAL TO RESOURCE BY SERVER IN WIRELESS COMMUNICATION SYSTEM, AND DEVICE FOR SAME

This application is a National Phase Application of International Application No. PCT/KR2013/007892, filed on Sep. 2, 2013, which claims the benefit of Indian Application No. 3703/CHE/2012 filed Sep. 7, 2012, which is hereby incorporated by reference in their entirety for all purposes as if fully set forth herein.

TECHNICAL FIELD

The present invention relates to a wireless communication system, and more particularly, to a method of managing an access right of a server for a resource of a terminal and an apparatus therefor.

BACKGROUND ART

In general, a DM (device management) technology corresponds to a technology capable of changing configuration of a specific device in a manner that a device management server remotely controls variables stored in the specific device or a value of an object using an efficient method. Ongoing effort to develop the DM technology as an international standard is in progress by OMA (Open Mobile Alliance) based on SynchML Data Synchronization written in SynchML Initiative (Synchronization Markup Language) forum and the DM technology has been already accepted by a different standardization group and worldwide communication service providers as a future device management technology standard. Compared to a different device management technology, the OMA device management technology includes such a standard supporting various functions as a device management protocol standard, a standard for a device management document expression scheme, a standard for binding with a transmission protocol, a standard for a device management tree and a device management node, a standard for a DDF (device description framework), a standard for notification and the like.

The device management can be performed in a manner that a device management server (DMS) transmits a command for a management object (MO) existing at the inside of a device to the device and a device management client (DMC) of the device performs the command. The DMC corresponds to an entity configured to receive the command from the DMS and perform the command in a manner of being mounted on the device. The MO is logically connected with a management tree (or tree) or a node of the tree existing at the inside of the device. Hence, the device management server can control the MO, which becomes a target of a command, or a tree or a node related to the MO by the command for the MO. The MO generally exists at a database of the device and the device management server can indicate a management command in a manner of accessing the MO via URI of the tree or the node.

DISCLOSURE OF THE INVENTION

Technical Task

The present invention intends to propose a method of managing an access right of a server for a resource of a terminal in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of managing an access right for a resource of a terminal of a server, which is performed by a gateway device, includes the steps of receiving a management command from a primary server to add or modify an ACL (access control list) for a resource(s) to a privilege MO (management object) for a secondary server, which has no access right for the resource(s) of a terminal or a terminal group, requesting ACL(s) for the resource(s) to the terminal or each of terminals belonging to the terminal group, receiving the ACL(s) for the resource(s) from the terminal or each of the terminals belonging to the terminal group, determining whether or not the primary server has a right to perform the management command based on the received ACL(s) and if it is determined that the primary server has the right to perform the management command, adding or modifying the ACL for the resource(s) to the privilege MO. The privilege MO is stored in the gateway device and can include information on an access right for a resource of a specific terminal of a specific server.

Preferably, the privilege MO can include a target identifier node indicating an identifier of a terminal or a terminal group corresponding to a target of a specific command, a target type node indicating whether or not the target identifier corresponds to an identifier of a single terminal or an identifier of a terminal group, an URI (uniform resource identifier) node indicating a specific resource of the terminal or the terminal group to which the specific command is applied and a privilege ACL node indicating an access right for the specific resource.

Preferably, the method can further include transmitting a result of processing the management command, which is used for adding or modifying an ACL for a specific resource of the terminal to the privilege MO, to the primary server.

Preferably, the determining whether or not the primary server has the right to perform the management command can include determining whether or not the primary server has a right to modify the ACL(s) for the resource(s) received from the terminal or each of the terminals belonging to the terminal group.

Preferably, if the primary server does not have the right to modify the ACL for at least one of the resources received from each of the terminals belonging to the terminal group, it is determined that the primary server has no right to perform the management command.

Preferably, if it is determined that the primary server has no right to perform the management command, the method may further include transmitting a result indicating that the management command has failed to the primary server.

Preferably, the method may further include transmitting an ID of a terminal(s), which the primary server has no right to perform the management command, together with the result.

Preferably, if a management command for the resource(s) of the terminal or the terminal group is received from the secondary server, the method may further include authenticating a right of the secondary server based on a privilege ACL for the resource(s) in the privilege MO.

Preferably, the authenticating may include determining whether or not the secondary server has a right to perform the management command based on the privilege ACL for the resource(s) in the privilege MO.

To further achieve these and other advantages and in accordance with the purpose of the present invention, as embodied and broadly described, according to a different embodiment, a gateway device configured to manage an access right for a resource of a terminal of a server includes an RF (radio frequency) unit and a processor configured to control the RF unit, the processor configured to receive a management command from a primary server to add or modify an ACL (access control list) for a resource(s) to a privilege MO (management object) for a secondary server, which has no access right for the resource(s) of a terminal or a terminal group, the processor configured to request ACL(s) for the resource(s) to the terminal or each of terminals belonging to the terminal group, the processor configured to receive the ACL(s) for the resource(s) from the terminal or each of the terminals belonging to the terminal group, the processor configured to determine whether or not the primary server has a right to perform the management command based on the received ACL(s), the processor, if it is determined that the primary server has the right to perform the management command, configured to add or modify the ACL for the resource(s) to the privilege MO, wherein the privilege MO is stored in the gateway device and can include information on an access right for a resource of a specific terminal of a specific server.

The aforementioned solutions are just a part of embodiments of the present invention. Various embodiments to which technical characteristics of the present invention are reflected can be drawn and understood based on detail explanation on the present invention to be described in the following by those skilled in the corresponding technical field.

Advantageous Effects

According to one embodiment of the present invention, it is able to efficiently manage an access right of a server for a resource of a terminal.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIGS. 5(a)-(b) are flowcharts for a method of managing authentication according to one embodiment of the present invention;

FIGS. 6 (a)-(b) are diagrams for an example of assigning right for a specific resource of a specific terminal to one or more secondary servers via a right of a primary server according to one embodiment of the present invention;

BEST MODE

Mode for Invention

Figure 1:
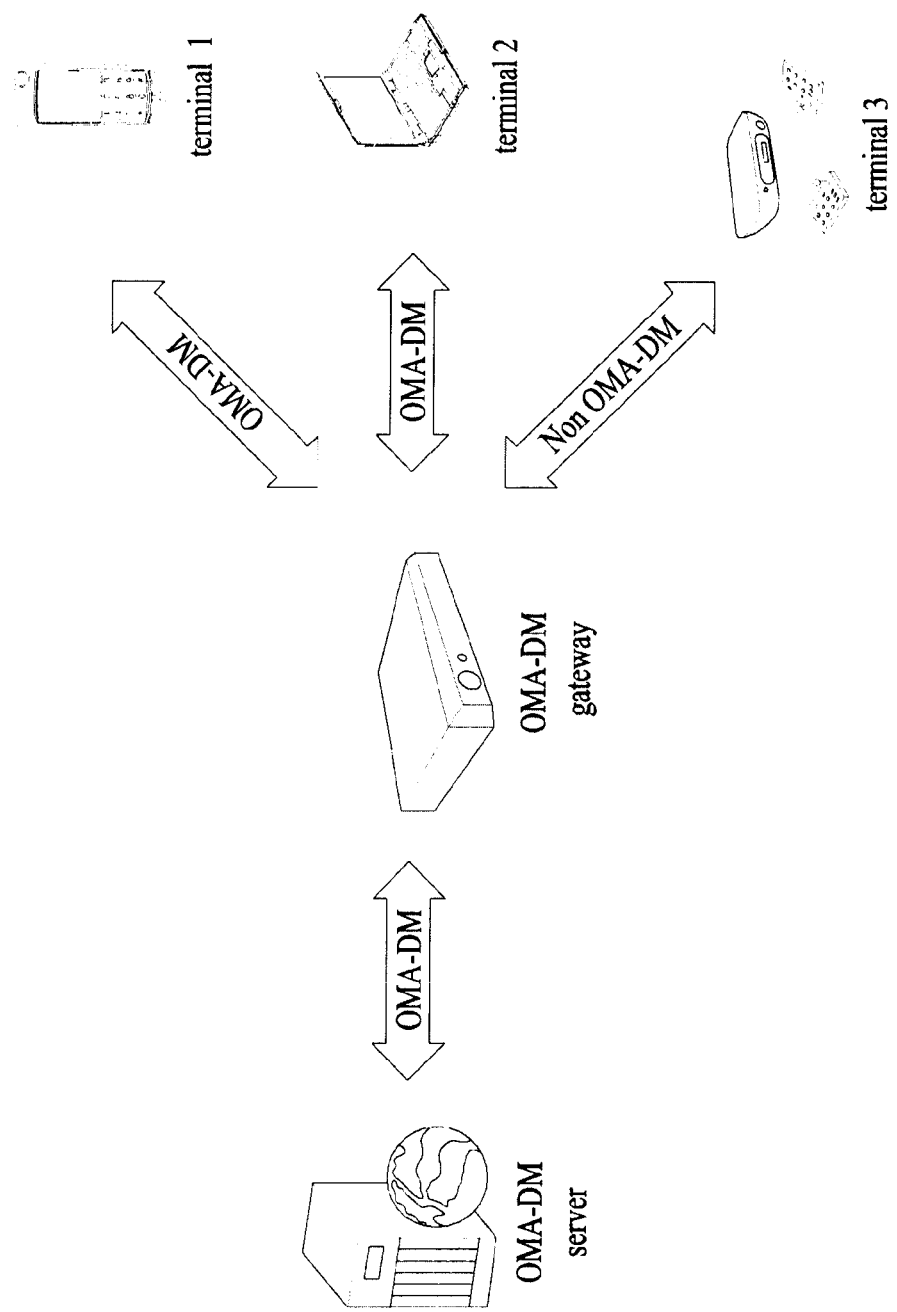
FIG. 1 is a diagram for an example of a device management (DM) system using a device management gateway.

Reference will now be made in detail to the preferred embodiments of the present invention, examples of which are illustrated in the accompanying drawings. The following detailed description of the invention includes details to aid in full understanding of the present invention. Those skilled in the art will appreciate that the present invention can be implemented without these details.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present invention, devices for device-to-device communication, that is, M2M devices, may be fixed or mobile and include devices which communicate with a server for device-to-device communication, that is, an M2M server to transmit/receive user data and/or various types of control information. The M2M devices may be referred to as terminal equipment, mobile stations (MSs), mobile terminals (MTs), user terminals (UTs), subscriber stations (SSs), wireless devices, personal digital assistants (PDA), wireless modems, handheld devices and the like. In the present invention, the M2M server refers to a fixed station which communicates with M2M devices and/or other M2M servers, and exchanges various types of data and control information with M2M devices and/or other M2M servers by communicating with the M2M devices and/or other M2M servers.

A description will be given of the background associated with the present invention.

Device Management

Device management (DM) refers to management of device configuration and other managed objects of devices from the point of view of various management authorities. Device management includes subsequent updates of persistent information in devices, retrieval of management information from devices and processing events and alarms generated by devices, but is not restricted to setting initial configuration information in devices.

Management Tree

Management tree is an interface by which a management server interacts with a DM client, e.g. by storing values in the management tree or retrieving values therefrom and by manipulating the properties of the management tree, for example, access control lists (ACLs). In the specification, the management tree may be used interchangeably with a device management tree or DM tree.

Management Object (MO)

A management object is a subtree of the management tree which is intended to be a (possibly singleton) collection of nodes which are related in some ways. For example, ./Devinfo Node and child nodes thereof can form a management object. A simple management object may consist of a single node.

DM Server or DMS (Device Management Server)

A DM server or DMS may be an abstract software component in a deployed device management infrastructure that conforms to OMA device management enabler static conformance requirements specified for the DM servers or DMS. The DM server or DMS can serve as an end-point of DM client-server protocols and DM server-server Interface.

Further, the DM server or DMS may be set in an apparatus, device, computer and the like, which include a communication module, processor module and the like, and thus the DM server or DMS can be implemented as one device.

DM Client or DMC (Device Management Client)

A DM client or DMC may be an abstract software component in a device implementation that conforms to the OMA device management enabler static conformance requirements specified for DM clients. The DM client or DMC can serve as an end-point of the DM client-server protocols.

Further, the DM client or DMC may be set in a device including a communication module, processor module and the like, which is a target of DM, and thus the DM client or DMC can be implemented as one device.

Access Control List (ACL)

An ACL is a list of DM server identifiers for a specific node in a management tree and access rights associated with each identifier.

Node

A Node is a single element in a management tree. There can be two kinds of nodes in a management tree: interior nodes and leaf nodes. The format property of a node provides information about whether the node is a leaf or an interior node.

Interior Node

An interior node may have child nodes but cannot store any value allocated thereto, that is, a node value. The format property of the interior Node is "node".

Leaf Node

A leaf node can store a node value but cannot have child nodes. The format property of the leaf Node is not "node". Accordingly, all parent nodes must be interior nodes.

Permanent Node

A permanent node is a node having DDF property scope set to "permanent". If a node is not a permanent node, the node corresponds to a dynamic node. The permanent node cannot be dynamically generated or deleted by a server Dynamic Node A dynamic node is a node having DDF property scope set to "dynamic" or having unspecified DDF property scope.

Sever Identifier

A server identifier refers to an OMA DM internal name for a DM server. A DM server is associated with a server identifier present in a device through an OMA DM account.

ACL Property and ACL Values

All terminals managed by the DM protocol have one DM tree starting with a root node and the DM protocol performs a management instruction for a terminal by operating each node of the DM tree. For example, to install downloaded software in a terminal, the software can be installed by executing a node "install" matched to the software. Each node may represent simple information such as a figure and complicated data such as picture data or log data. In addition, each node may represent one command such as "execute" or "download".

Each node has properties of providing meta information related thereto. The properties include a runtime during which the corresponding node can be used from generation of the node in a DM tree to extinction thereof. The runtime property includes ACL, format, name, size, title, TStamp, type and VerNo.

The ACL (Access Control List) is an indispensable function that both a terminal and a server need to execute in DM 1.3 protocol. The ACL specifies DM commands that a specific DM server can execute for a specific node. An unspecified DM command cannot be executed. In other words, the ACL refers to the authority permitted for a specific DM server for a specific node. In the DM protocol, the ACL is given to the server identifier of a DM server, instead of the URI and IP address of the DM server and DM server certificate. The server identifier is used as an identifier for authenticating the DM server in the DM protocol. In addition, the ACL can be provided as ACL properties and ACL values given to the ACL properties. In the specification, the ACL values can be interchangeably referred to as ACL information or information about the ACL. In the DM 1.3 protocol, all nodes have the ACL properties and nodes having the ACL properties are defined such that the nodes have empty ACL values or non-empty ACL values.

The ACL has unique properties including ACL inheritance, different from the runtime property. The ACL inheritance refers to acquisition of ACL values of a node in a DM tree from ACL values of the parent node of the node when the node in the DM tree does not have the ACL values. If the parent node does not have ACL values, then the ACL values are obtained from ACL values of the parent node of the parent node. Since the DM protocol specifies that the root node, the highest node of a DM tree, must have ACL values, the ACL values must be inherited. ACL inheritance from a parent node is performed only when ACL values are empty because ACL inheritance is carried out for total ACL values instead of for individual DM command That is, when ACL values of a certain node specify only authority "Add", authority "get", which is not specified, is not inherited.

In the DM protocol, the root node has "Add=*&Get=*" as a basic value with respect to the ACL. Here, "*" is a wildcard and refers to an arbitrary DM server. The DM server uses the "Get" command in order to obtain an ACL value and the "Get" command with respect to "./NodeA/Node1?prop=ACL" gets ACL values of ./NodeA/Node1. Further, "Replace" command is used in order to replace ACL values. That is, ACL values are replaced by executing the "Replace" command on "./NodeA/Node1?prop=ACL" to change the value to "Add=DMS1&Delete=DMS1&Get=DMS1". In the DM protocol, an individual ACL entry cannot be changed but all ACL values can be changed at once. The authority to get and correct ACL values is defined on the basis of the ACL. Authorities for the interior node and the leaf node are defined differently.

Interior Node

If three are "Get" authority and "Replace" authority for the corresponding node, it is possible to get and replace ACL values of the corresponding node. The "Replace" authority refers to the authority to replace ACL values of all child nodes.

Leaf Node

If there is "Replace" authority for the parent node of the corresponding node, then ACL values of the corresponding node can be replaced. To get the ACL of the corresponding node, the "Get" authority for the parent node of the corresponding node is required. When the "Replace" authority for the corresponding node is present, ACL values of the corresponding node can be replaced. To replace the ACL of the corresponding node, the "Replace" authority for the parent node of the corresponding node is needed.

The authority to replace ACL values of a node can be controlled by ACL values of the parent node of the node irrespective of whether the node is an interior node or a leaf node. When the "Replace" authority for an interior node is present, not only ACL values of the interior node but also ACL values of all child nodes can be replaced. Accordingly, if the "Replace" authority for the root node is present, then any authority can be provided for all nodes in the DM tree. However, having the "Replace" authority for a parent node does not mean having a specific authority such as "Get" for a child node of the parent node and the "Get" authority needs to be directly specified for the child node. Therefore, ACL values need to be corrected prior to execution of a command and ACL values of the corresponding child node are finally corrected through correction of ACL values of all nodes on a path to the child node. This is inconvenient and thus the DM protocol allows direct correction of ACL values of a corresponding node without correction of ACL values of intermediate nodes when the "Replace" authority for the parent or ancestor node of the corresponding node is present.

When the DM server generates a new node through "Add" command, the generated node does not have ACL values in general and thus all authorities are inherited from a parent node of the node. However, when the generated node is an interior node and the authority "Replace" is not present for the parent node, it is necessary to have the authority to manage the corresponding node by setting ACL values of the node at the same time as when the node is generated.

The syntax for representing ACL values is defined in [DM-TND] and an example of ACL values is "Get=DMS1&Replace=DMS1&Delete=DMS2". Here, DMS1 and DMS2 are server identifiers of DM servers and Get, Replace and Delete are DM commands. Accordingly, DMS1 can execute the "Get" and "Replace" commands for the corresponding node and DMS2 can execute the "Delete" command. Here, Get=DMS1, Replace=DMS1 and Delete=DMS2 are ACL-entries and represent individual command authorities of DM servers. That is, ACL values correspond to a set of ACL-entries and ACK values of each node may include at least one ACL entry.

DDF (Device Description Framework)

DDF is a specification for how to describe the management syntax and semantics for a particular device type. DDF provides information about MO of a terminal, management function and DM tree structure.

DM 1.3 Authentication

In DM 1.3, authentication is performed on the basis of the ACL. DM authentication is performed per DM command. When the DM server transmits a plurality of DM commands, a DM client (referred to as a DMC hereinafter) performs authentication prior to execution of an individual command and executes only a permitted DM command as a result of authentication.

FIG. 1 is a diagram for an example of a device management (DM) system using a device management gateway. An OMA DM protocol is used for a remote control of a terminal. Mostly, a DM server and a DM client perform direct communication with each other. Yet, the direct communication between the DM server and the DM client is not available all the time and the direct communication may be not preferable in some cases. This may happen when a terminal is located at a fire wall or NAT (network address translation) environment or when a terminal supports a different protocol (e.g., BBF TR-069 etc.) rather than the OMA DM protocol. An OMA DM gateway provides a gateway function for the OMA DM protocol. The OMA DM gateway provides not only a function capable of indirectly managing a terminal but also a management function based on various gateways.

FIG. 1 shows a scenario of a DM server indirectly managing a terminal via a DM gateway. A terminal is located at the behind of the DM gateway. Although a terminal supports a different protocol (non OMA-DM) rather than the OMA DM protocol, if the terminal uses the DM gateway, the terminal can perform device management.

The DM gateway supports three types of modes of operation. The three types of operation modes correspond to a transparent mode, a proxy mode and an adaptation mode. Each mode enables the DM server to manage a terminal in a different way. An operation mode of the DM gateway can be differently configured according to a terminal. Referring to FIG. 1, a terminal 1 operates in the transparent mode, a terminal 2 operates in the proxy mode and a terminal 3 operates in the adaptation mode since the terminal 3 does not support the OMA DM protocol. The DM gateway can use one of the transparent mode and the proxy mode for a terminal supporting the OMA DM. Yet, for a terminal not supporting the OMA DM, the DM gateway should operate in the adaptation mode.

OMA DM Gateway Transparent Mode

In the transparent mode, the DM gateway helps the DM server to transmit a DM notification to a terminal(s) located at the behind of the DM gateway. The DM gateway delivers the DM notification to the terminal(s). When the terminal(s) receives the DM notification, the terminal establishes a direct DM session with the DM server. Hence, since a management operation is directly performed between the DM server and the DM client (i.e., terminal), the DM gateway does not participate in the management operation. In this case, a role of the DM gateway is restricted to the delivery of the DM notification which is delivered by the DM gateway instead of the DM server. For the transparent mode, the terminal directly initiates the DM session together with the DM server. This can be feasible since a fire wall and NAT block ingoing packets but permit outgoing packets.

Figure 2:
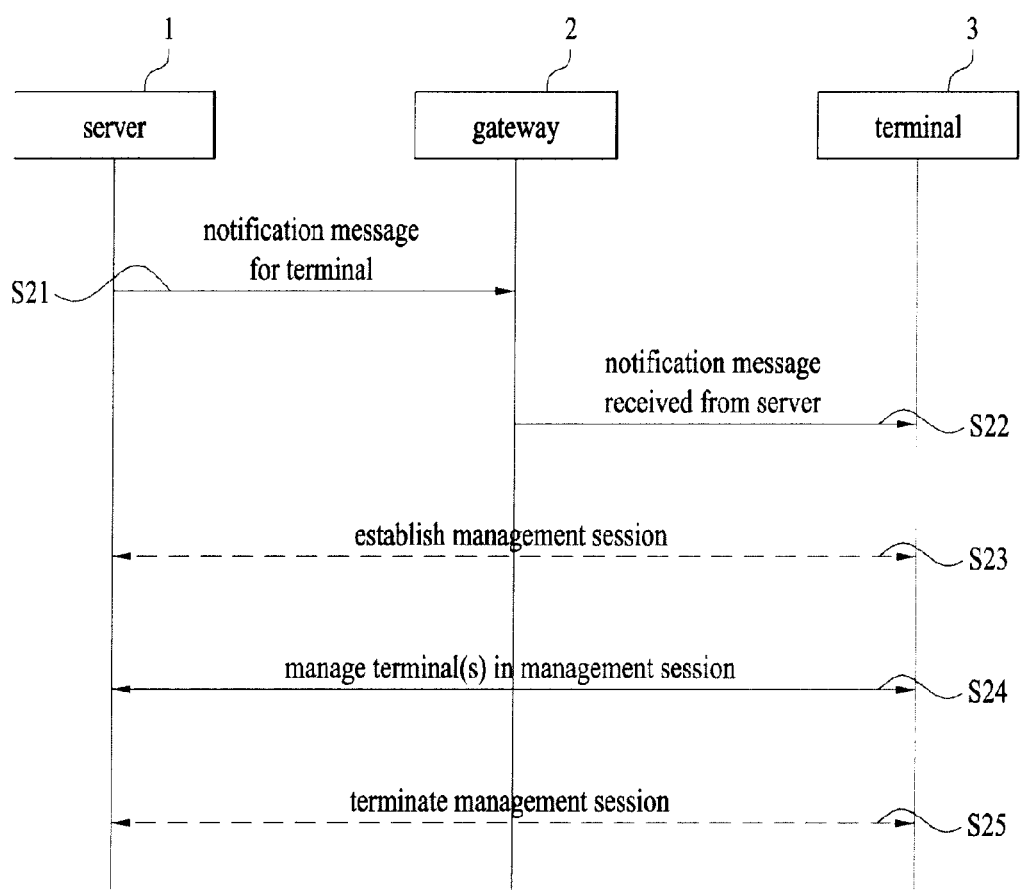
FIG. 2 is flowchart for an example of a management operation of a DM gateway in a transparent mode.

FIG. 2 is flowchart for an example of a management operation of a DM gateway in a transparent mode. Each flow is explained in the following.

S21: A server asks a gateway to deliver DM notification to a specific terminal(s).

S22: The gateway delivers the notification to a terminal according to the DM notification delivery request received from the server. A server-ID field included in the notification indicates an identifier of the server.

S23: Having received the DM notification from the gateway, the terminal establishes a management session with the server which is specified in the server-ID field of the notification.

S24: A direct management operation is performed between the server and the terminal.

S25: If the management operation ends, the server terminates the management session.

OMA DM Gateway Adaptation Mode

In the adaptation mode, the DM gateway manages the terminal(s) located at the behind of the DM gateway via non OMA DM protocol instead of the DM server. In case of operating in the adaptation mode, it is expected that the DM gateway will do its best for translation between OMA DM commands and a different management protocol.

OMA DM Gateway Proxy Mode

In the proxy mode, the DM gateway manages the terminal located at the behind of the DM gateway instead of the DM server via an OMA DM protocol. In this case, two related DM sessions are established. One session is established between the DM server and the DM gateway and another session is established between the DM gateway and the terminal. The DM gateway delivers a management command generated by the DM server to a target terminal(s). Having received responses transmitted from the terminal(s), the DM gateway may notify the DM server of a command completion status or may transmit a response of which commands of a plurality of terminals are aggregated to the DM server. A result of processing the management command can be retrieved via a fanout MO interface of the DM gateway. Delivering the management command, which is delivered from the server, to the terminal again by the DM gateway is called "fanout".

Since the terminal(s) to which the proxy mode is provided by the DM gateway directly receives a DM command from the DM gateway via the DM session established between the DM gateway and the terminal, the terminal(s) may be not aware of existence of the DM server.

Figure 3:
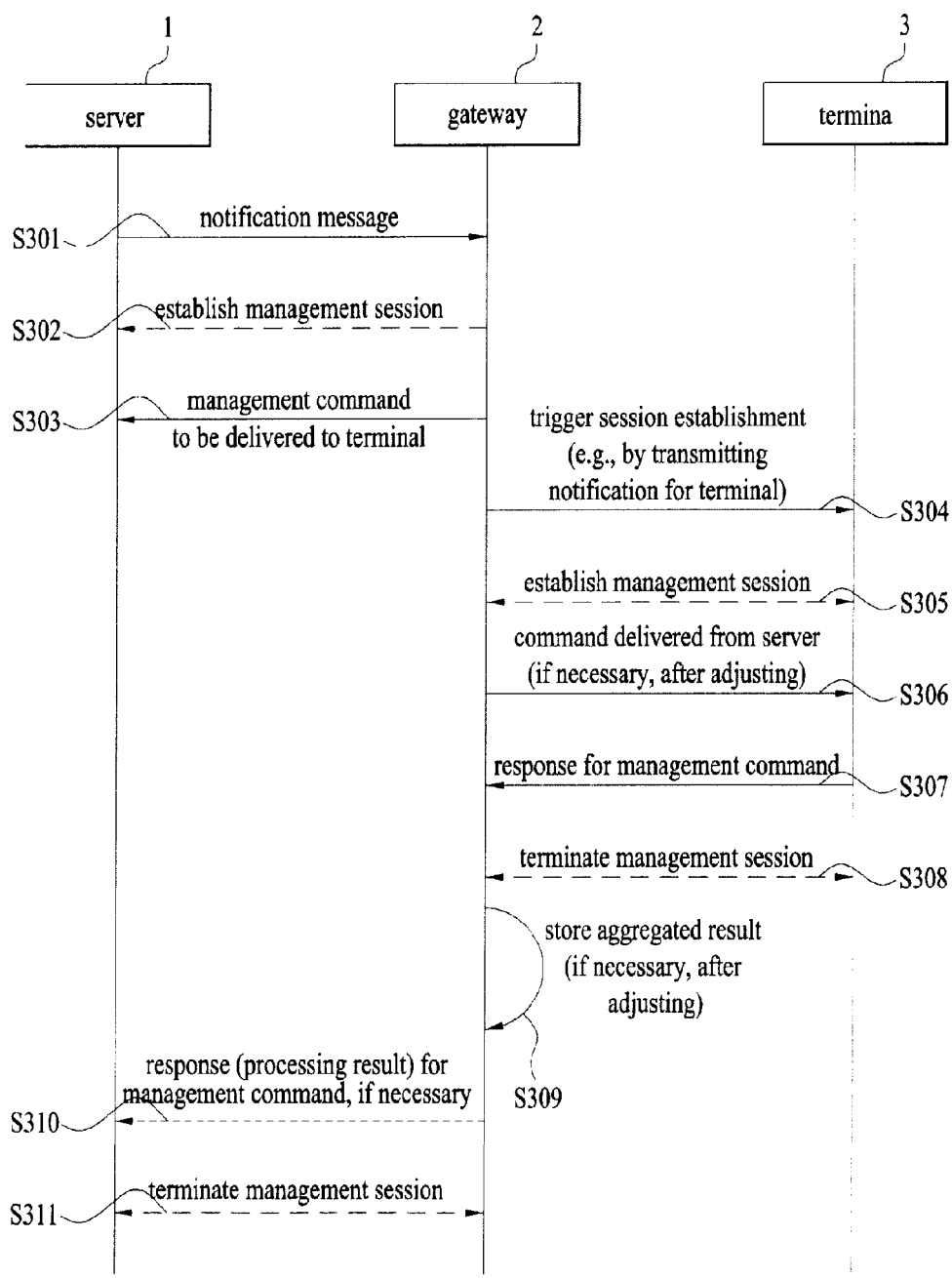
FIG. 3 is flowchart for an example of a management operation of a DM gateway in a proxy mode.

FIG. 3 is flowchart for an example of a management operation of a DM gateway in a proxy mode. Each flow is explained in the following.

S301: A server transmits a notification message to a gateway.

S302: Having received the notification message, the DM gateway establishes a session with the server. This session is a first session established in the proxy mode.

S303: The server configures management commands to be delivered to terminals to which the proxy mode is provided by the gateway and delivers the management commands to the gateway. Configured information includes a management command, an identifier of a terminal(s) corresponding to a target to which the management command is to be delivered and the like.

S304: In order to establish a management session with a terminal to which the management command is to be delivered, the gateway delivers the notification message to each terminal. Having received the notification message, the terminal establishes a management session with the gateway instead of the server since a server-ID field of the notification message includes an identifier of the gateway.

S305: Having received the notification message, the terminal establishes a management session with the gateway. This session is a second management session established in the proxy mode.

S306: Having established the management session with the terminal, the gateway delivers the management command delivered from the server in the step S303 to the terminal.

S307: The terminal processes the received management command and then delivers a response for the management command, i.e., a processing result for the management command and the like to the gateway.

S308: If the gateway does not have any management command to deliver, the gateway terminates the management session established with the terminal.

S309: The gateway stores the response for the management command received from the terminal.

S310: The gateway transmits the response for the management command to the server.

S311: The management session established between the server and the gateway is terminated.

The proxy mode of the gateway needs a management session between the server and the gateway and a management session between the gateway and the terminal for a scheme that the server indirectly manages the terminal via the gateway. Since a management command is directly delivered to the terminal by the gateway, the terminal may not be aware of existence of the server. Hence, the terminal checks whether the gateway instead of the server has a right for the received management command.

Figure 4:
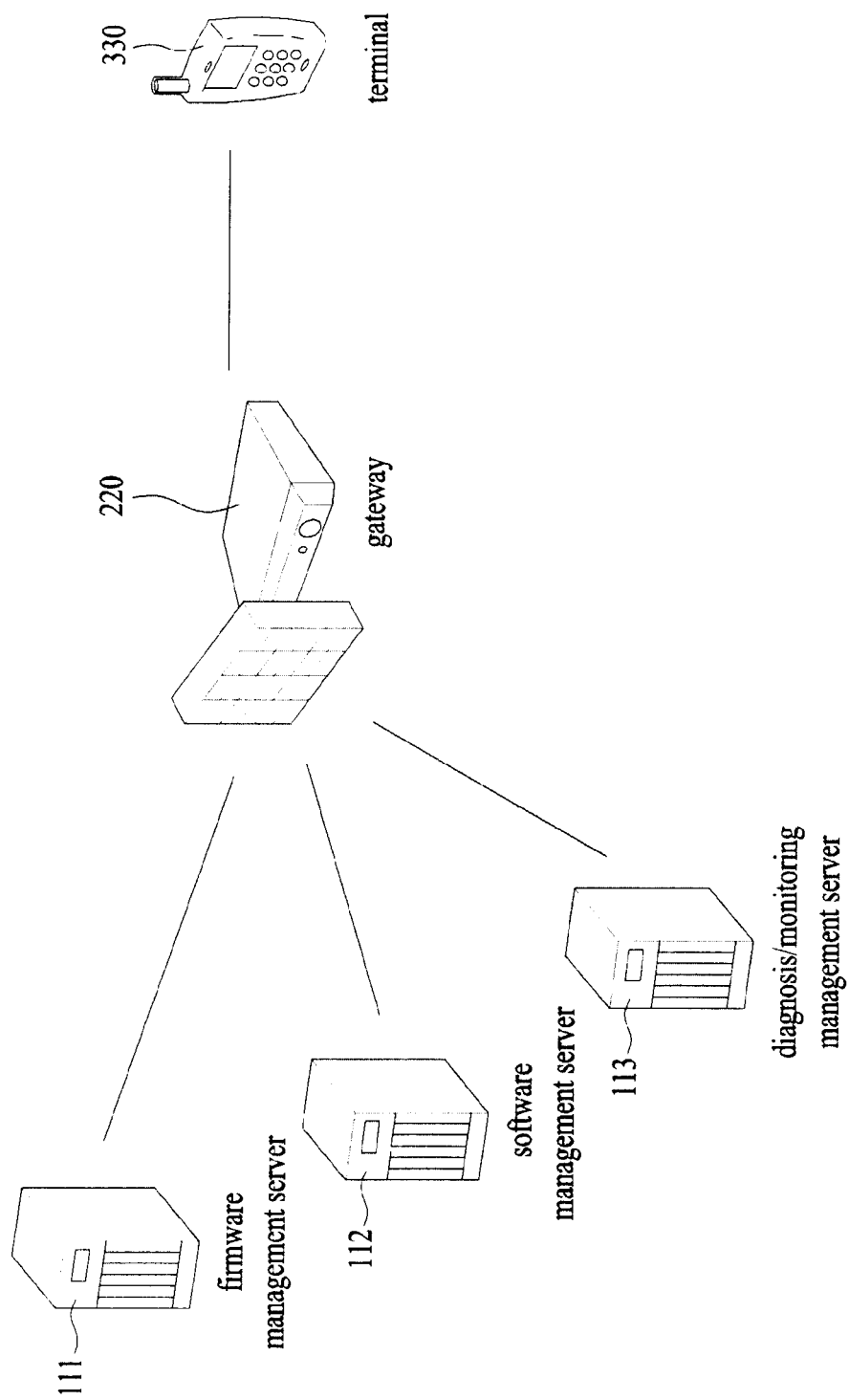
FIG. 4 is a diagram for an example of a proxy mode management operation.

DM protocol permits a plurality of servers to manage a single terminal. FIG. 4 shows the aforementioned situation.

FIG. 4 shows a scenario that three servers manage a terminal. The three servers perform firmware management, software management and diagnosis/monitoring-related function, respectively. Each of the servers has a right for a corresponding management category only. Each server is connected with the terminal via a proxy mode of a gateway. In case of the server managing the firmware, the server delivers a firmware management command to the terminal via the gateway. Since a device management client of the terminal receives the command via the gateway, the device management client checks whether the gateway has a right for the firmware management command. In particular, the device management client checks whether an access right for a specific resource corresponding to the firmware management command is permitted to the gateway. Since the aforementioned process is identically applied to other servers as well, the gateway should have all of a firmware management right, a software management right and a diagnosis/monitoring management right for a proxy mode operation.

In this case, if a software management server delivers a firmware management command to the gateway and the gateway delivers the command to the terminal as it is, a security problem occurs. In particular, although the software management server does not have a right for the command, the terminal may execute the command since the gateway has a right for the command. Hence, although the software management server has a right for the software management only, the software management server may make the terminal execute a command (i.e., firmware management command) beyond the right of the software management server using the firmware management right of the gateway. Hence, the gateway has the sum of rights of all servers in the proxy mode and may be then able to make the terminal perform a command provided by a specific server, which has no right for the command. Hence, there may exist a security vulnerability.

FIG. 5 is a flowchart for a method of managing authentication according to one embodiment of the present invention. The method corresponds to a method for a gateway to authenticate a management command of a server using an ACL value stored in a terminal. FIG. 5 (a) shows an authentication procedure of the gateway in a proxy mode. A server 110 can transmit a management command to a gateway 220 [S51]. The gateway 220 can transmit a command for bringing an access control list (ACL) of a terminal 330 to the terminal 330 [S52]. The ACL includes a list of rights for the terminal 330 of the server 110. The ACL includes information on servers, users and system processes of which an access to the terminal 330 is permitted. The ACL specifies operations permitted to the terminal 330. For more detail explanation on the ACL, it may refer to what is mentioned in the foregoing description.

The terminal 330 can provide the ACL to the gateway 220 [S53]. Having received the ACL, the gateway 220 can determine whether an ID of the server 110 is included in the ACL [S54]. If the ACL indicates that the server 110 has an access right for the management command, the gateway 220 recognizes the server 110 as an authenticated server and may be then able to transmit the management command to the terminal 330.

Meanwhile, if an ACL value requested by the gateway 220 is empty, the terminal 330 obtains the ACL value according to a rule of ACL inheritance and may be then able to transmit the ACL value to the gateway 220. If the terminal 330 obtains the ACL value according to the rule of the ACL inheritance and transmits the ACL value, the gateway 220 can determine whether the server 110 has a right for the management command. If the ACL indicates that the server 110 has an access right for the management command, the gateway 220 recognizes the server 110 as an authenticated server and may be then able to transmit the management command to the terminal 330 [S55].

FIG. 5(b) shows an authentication procedure of the gateway in a proxy mode. FIG. 5 (b) shows a case that the received ACL, which is mentioned earlier in the step S54 of FIG. 5 (a), indicates that the server 110 does not have a right for the management command. Hence, S510 to S540 are identical to S51 to S54 of FIG. 5 (a). In the step S540, if the ACL value indicates that the server 110 does not have a right for the management command, i.e., if authentication fails, the gateway 220 recognizes the server 110 as a non-authenticated server and may be then able to transmit an authentication fail response to the server 110 [S550].

FIG. 6 is a diagram for an example of assigning a right for a specific resource of a specific terminal to one or more secondary servers via a right of a primary server according to one embodiment of the present invention. FIG. 6 (a) shows an example of the secondary servers including a LAWMO (lock and wipe management object) server and a DCMO (device capability management object) server.

The primary server performs device management of a terminal A, B and C via a gateway ABC. The terminal A, B and C have an ACL permitted to the primary server to manage operations of the terminals. Hence, the gateway ABC can deliver a management command of the primary server to the terminal A, B and C. In this example, there exist two secondary servers, i.e., a LAWMO server and a DCMO server. The gateway ABC can provide a privilege to the servers via a permitted scheme enabling the LAWMO server and the DCMO server to manage operations of the terminal A, B and C. The primary server can make the gateway ABC provide a limited privilege for specific resources of the terminals to the servers.

In this case, an ACL specifying the access privilege is called a privilege ACL and an MO (management object) including the privilege ACL is called privilege MO.

FIG. 6 (b) shows an example that the gateway provides a right to a DCMO server.

The primary server may configure a privilege of turning on/off a camera of a terminal A for the DCMO server. By doing so, the DCMO server is able to turn on/off the camera of the terminal A as long as the terminal A is managed by the gateway ABC.

In this example, the primary server may configure a privilege for other servers in the gateway ABC in a level of the gateway ABC. To this end, the gateway ABC needs a privilege MO.

Figure 7:
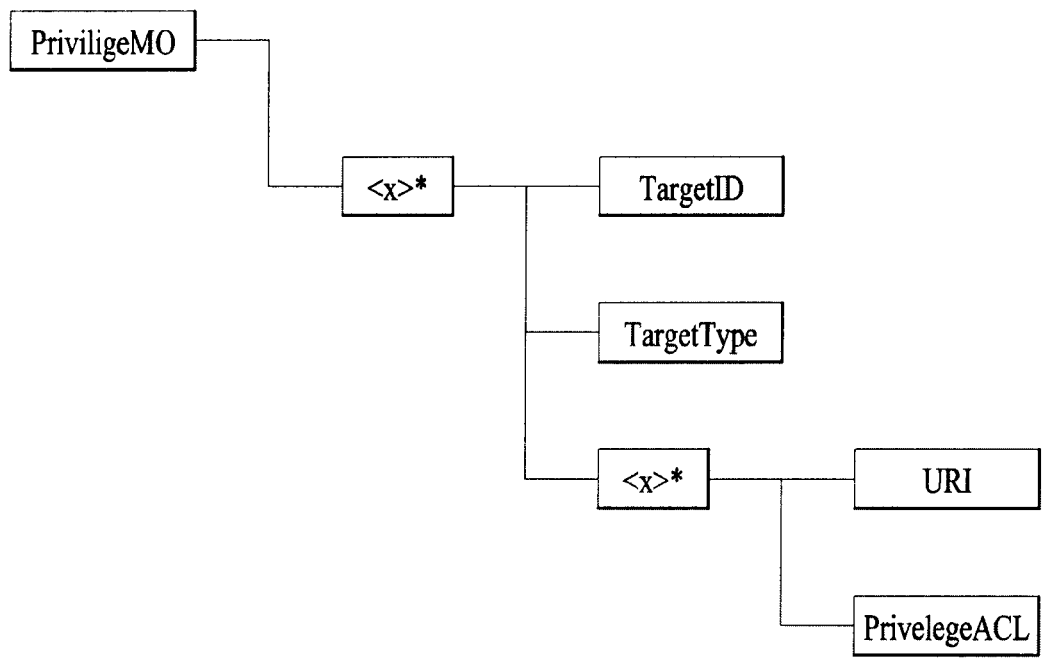
FIG. 7 is a diagram for a privilege MO according to one embodiment of the present invention.

FIG. 7 is a diagram for a privilege MO according to one embodiment of the present invention. The privilege MO includes a target ID node, a target type node, an URI (uniform resource identifier) node and a privilege ACL node. The target ID node indicates information on a specific terminal or a terminal group, i.e., a terminal ID or a terminal group ID. The target type node indicates information on whether the target ID corresponds to a single terminal or a terminal group. The URI node indicates information on a specific resource in a terminal or a terminal group indicated by the target ID in a URI form. The privilege ACL node indicates a privilege ACL capable of controlling and managing a specific resource of the target ID. For instance, the privilege MO may have privilege ACL information (designated by the privilege ACL node) on a specific resource (designated by the URI node) of a specific terminal or a terminal group (designated by the target node and the target type node). Moreover, explanation on the privilege ACL may refer to the explanation on the ACL attribute, the ACL value and the like mentioned earlier in the foregoing description.

Figure 8:
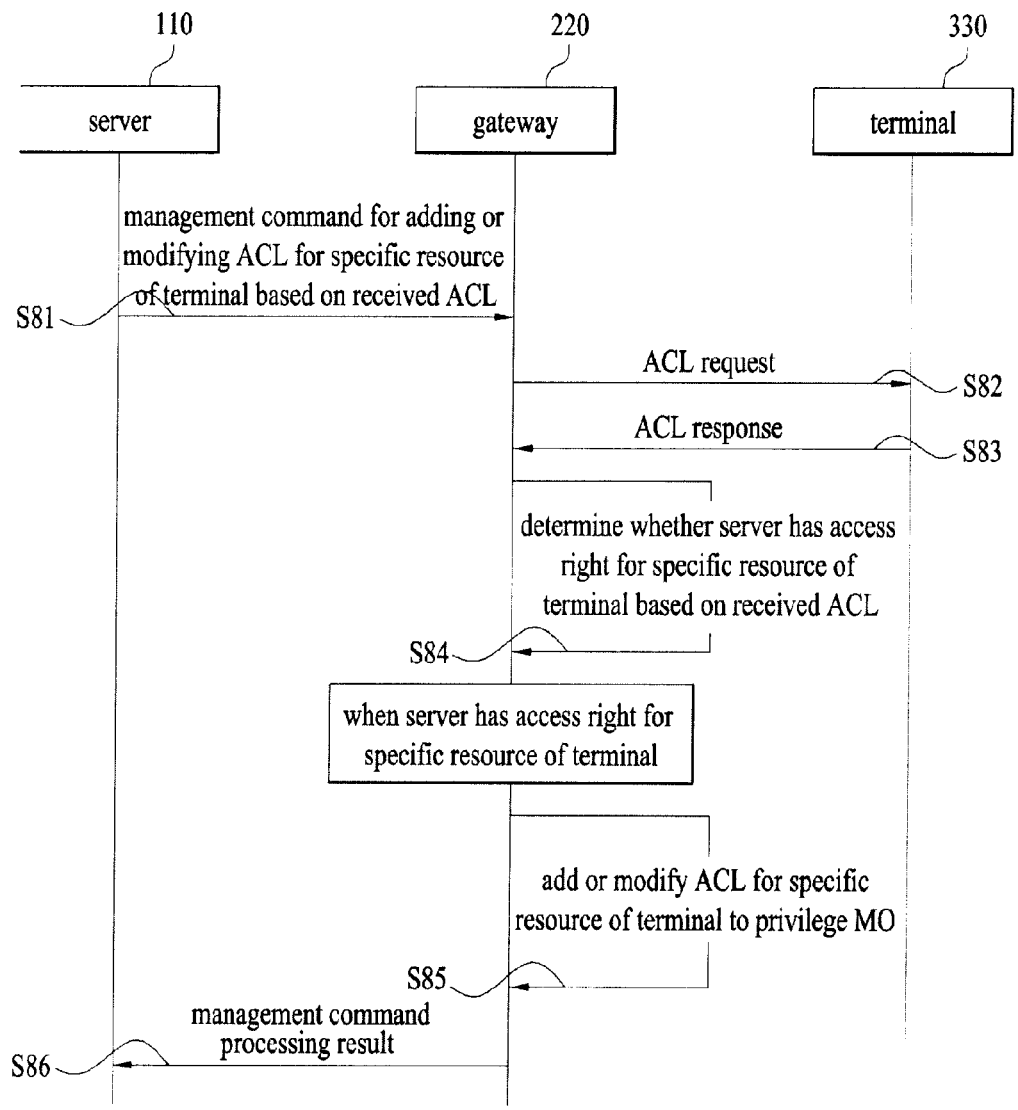
FIG. 8 is a flowchart for a procedure of adding or modifying a privilege ACL in a privilege MO according to one embodiment of the present invention.

FIG. 8 is a flowchart for a procedure of adding or modifying a privilege ACL in a privilege MO according to one embodiment of the present invention. A server 110 can transmit a management command to a gateway 220 [S81]. The management command is used for adding or modifying a privilege ACL for a specific resource of a target ID to a privilege MO in the gateway 220. If an ACL for a specific resource of a specific terminal is added or modified to the privilege MO, other servers, which do not have a right for the specific resource of the specific terminal, may access the specific resource. In order for the gateway 220 to determine whether the server 110 has a right to execute the management command for the specific resource, the gateway 220 may request an ACL to a terminal 330 [S82]. The terminal 330 can provide an ACL to the gateway 220 in response to the request [S83]. The gateway 220 can check whether the server 110 has a right to modify (replace) an ACL for the specific resource of the terminal 330 [S84]. If the server 110 has the right capable of modifying the ACL, the gateway 220 can add or modify a privilege ACL, i.e., the privilege ACL for the specific resource of the terminal 330 requested by the server 110 via the management command in the step S81, to the privilege MO configured in the gateway [S85]. Subsequently, the gateway 220 can transmit a result of the addition or modification, i.e., a result of processing the management command, to the server 110 [S86].

As mentioned in the foregoing description, according to the embodiment related to FIG. 8, a preliminary management capable of accessing a specific resource can be performed using the server 110 and the gateway 220 for servers, which have no access right to the specific resource of a specific terminal. In particular, if an ACL for the server (hereinafter called a secondary server), which has no access right, is added to a privilege MO in the gateway 220 and the secondary server transmits a management command for the specific resource in the future, the gateway 220 can authenticate an access right of the secondary server based on a privilege ACL of the privilege MO. According to a legacy proxy mode, the gateway delivers a management command to the terminal without any authentication for the management command received from the secondary server. Hence, there is no management for the management command. On the contrary, according to an embodiment of the present invention, it is able to provide a medium capable of managing an access right of the secondary server(s) via a privilege MO. According to a different embodiment of the present invention, a method of adding a privilege ACL to a terminal group in a level of the gateway using a privilege MO is proposed to manage the terminal group. The method can be performed by assigning the privilege ACL to the terminal group.

Figure 9:
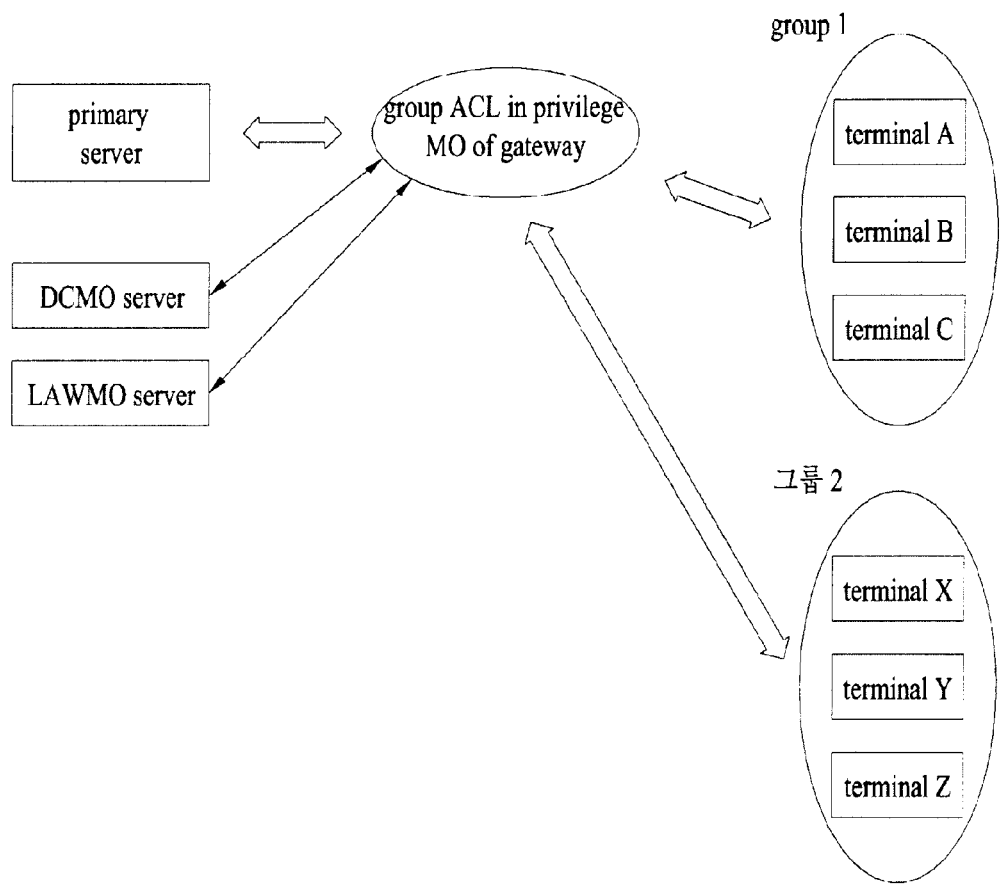
FIG. 9 is a diagram for a system to which a terminal group managed by a gateway is applied.

FIG. 9 is a diagram for a system to which a terminal group managed by a gateway is applied. There exist two terminal groups, i.e., a group 1 and a group 2, in environment shown in FIG. 9. The group 1 consists of a terminal A, a terminal B and a terminal C and the group 2 consists of a terminal X, a terminal Y and a terminal Z. A DCMO server and a LAWMO server correspond to a secondary server in the system. In particular, the DCMO server and the LAWMO server have no right for the terminals belonging to the group 1 and the group 2. A primary server may assign a right to the DCMO server to perform a common management operation for the group 1 in a manner of adding a privilege ACL to the group 1. The common management operation may correspond to an operation of turning on/off a camera of the terminals belonging to the group 1 for example. In this example, if ACL authentication for a partial terminals belonging to the group fails, a whole authentication procedure fails.

Figure 10:
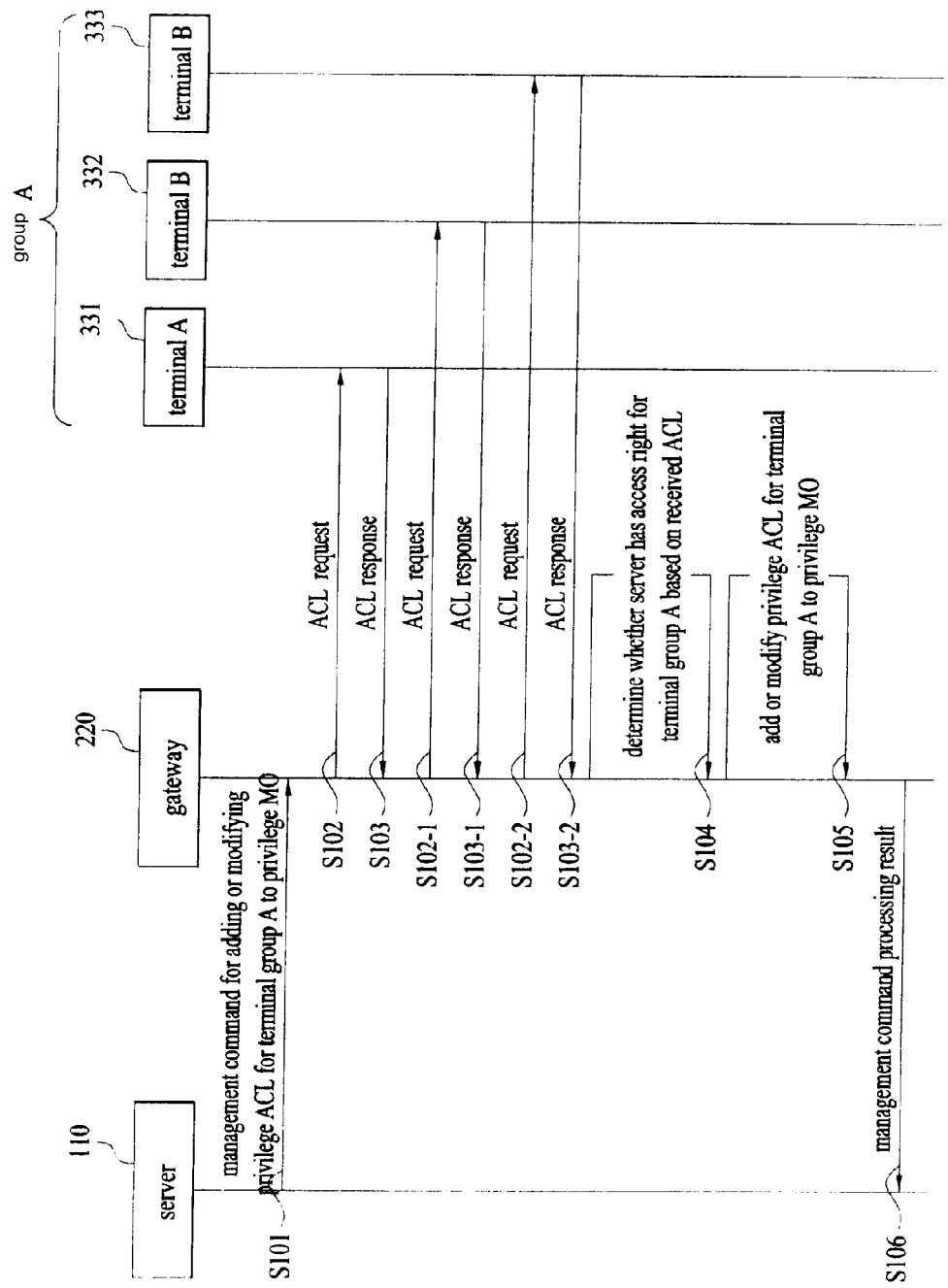
FIGS. 10 and 11 are flowcharts for an operation of adding a privilege ACL to a terminal group according to one embodiment of the present invention.

FIG. 10 is a flowchart for an operation of adding a privilege ACL to a terminal group according to one embodiment of the present invention. A server 110 can transmit a management command to a gateway 220 [S101]. The management command is used for adding or modifying a privilege ACL to a group 1 consisting of a terminal A, a terminal B and a terminal C. The gateway 220 requests an ACL to each of the terminals [S102, S102-1, S102-2] and each of the terminals can provide an ACL to the gateway in response to the request [S103, S103-1, S103-2]. The gateway 220 can determine whether the server 110 has a right to modify (replace) the ACL of specific resources of all terminals [S104]. If it is determined that the server 110 has the right to modify the ACL, the gateway 220 can add a privilege ACL for the terminal group to a privilege MO [S105]. Subsequently, the gateway 220 can transmit a result of processing the management command to the server 110.

Figure 11:
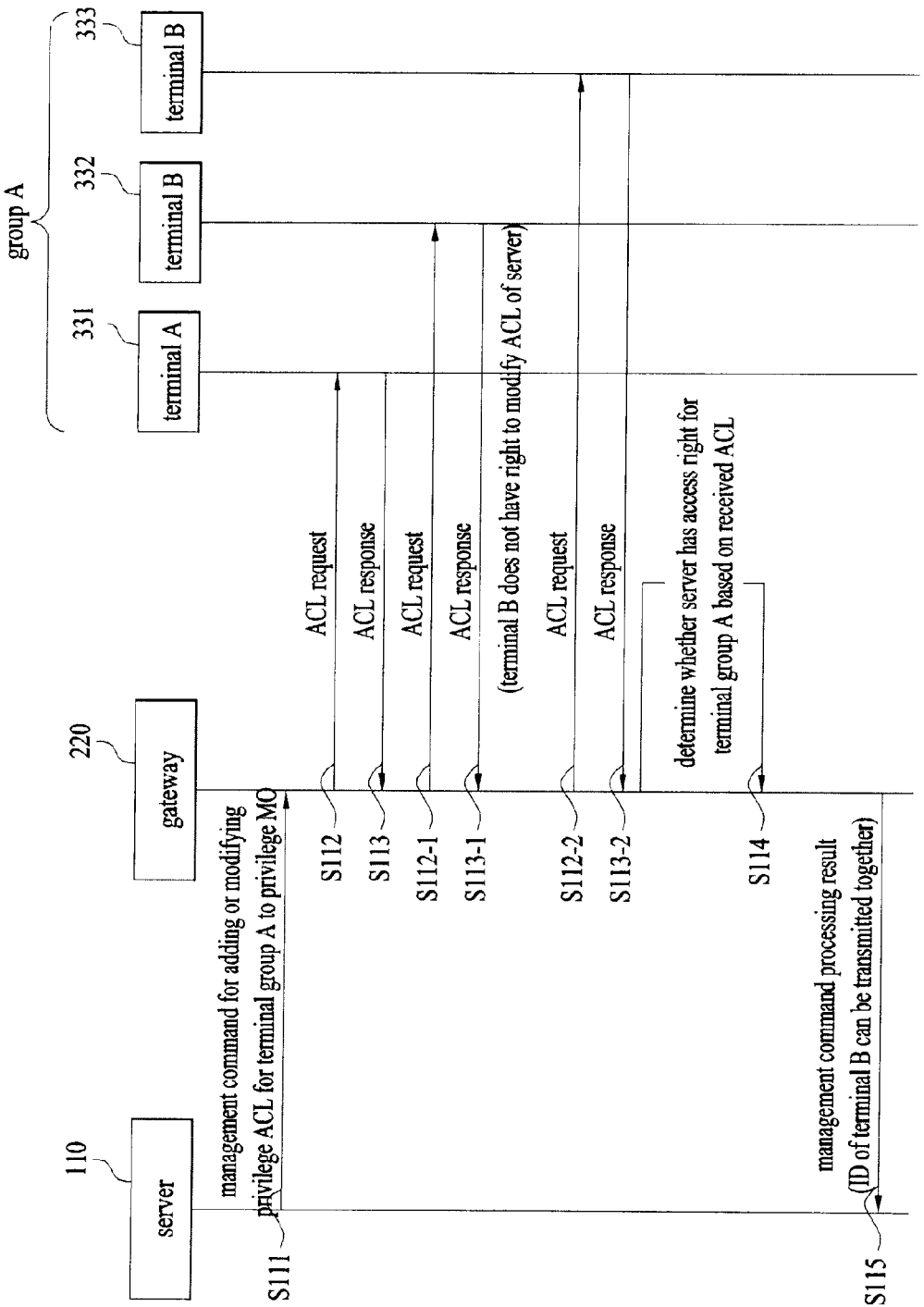

FIG. 11 is a flowchart for an operation of adding a privilege ACL to a terminal group according to one embodiment of the present invention. An example of FIG. 11 corresponds to an example for a case determined as the server 110 does not have a right for a partial terminal among terminals belonging to a terminal group A in the step S104 of FIG. 10. Since the step S111 to S114 of FIG. 11 are identical to the step S101 to S104 of FIG. 10, explanation on the steps is omitted at this time. According to the present embodiment, the terminal B belonging to the terminal group A has no right to modify an ACL of the server 110. Hence, the gateway 220 is unable to add or modify a privilege ACL for the terminal group to a privilege MO and may be then able to transmit a response indicating that a result of processing the management command fails to the server 110 [S115]. Moreover, the gateway 220 can provide an ID of a terminal(s), which has no right to modify the server 110, to the server 110.

Figure 12:
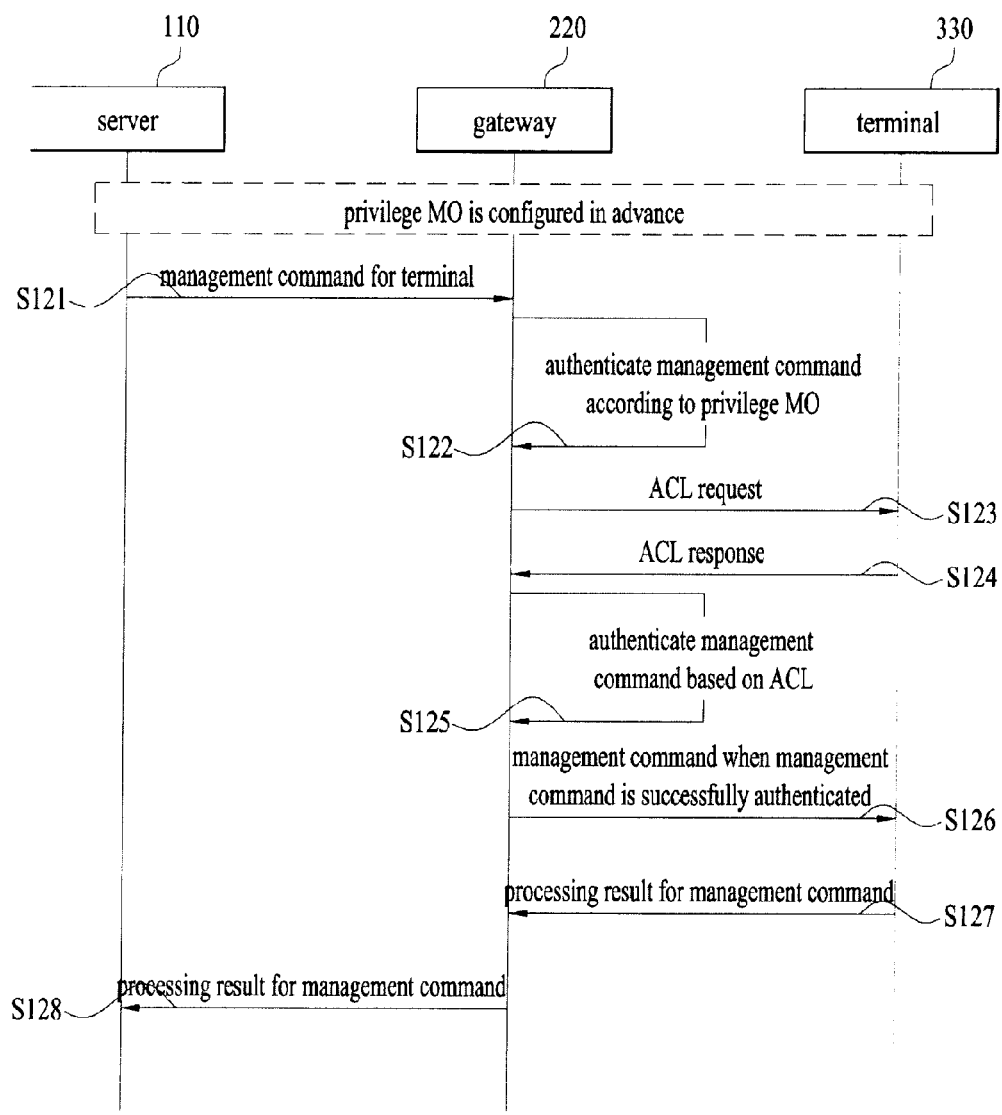
FIG. 12 is a flowchart for a method of managing authentication using an ACL of a terminal and a privilege MO at the same time according to one embodiment of the present invention.

FIG. 12 is a flowchart for a method of managing authentication according to a different embodiment of the present invention. The method corresponds to a method of which previously proposed two methods are combined with each other. According to the previously proposed first method, a gateway directly checks whether a server has a right for a management command to be delivered to a terminal based on an ACL existing in the terminal. According to the second method, the gateway stores information on a right of a server(s) in a privilege MO and checks whether the server has a right for a management command to be delivered to a terminal using the information.

The method shown in FIG. 12 corresponds to a combination of the first and the second method. The method corresponds to a method of authenticating a right for a management command transmitted by a server by utilizing both information on a right stored in a privilege MO and ACL information existing in a terminal.

Each step is explained in detail in the following.

Since the present method utilizes both the privilege MO existing in the gateway and the ACL information existing in the terminal, the privilege MO should be configured in advance. Assume that the privilege MO is configured in advance according to the method of configuring the privilege MO mentioned earlier in FIG. 10 to FIG. 11.

S121: A server 110 delivers a management command for a terminal 330 to a gateway 220.

S122: Having received the management command, the gateway 220 checks whether the server 110, which has transmitted the management command, has a right to execute the management command for the terminal 330 using the information on the right stored in the privilege MO of the gateway. If it is determined that the server has no right to execute the management command, the gateway 220 delivers a status code indicating that the server has no right to the server 110. If it is determined that the server 110 has the right to execute the management command by the privilege MO, it may perform the step S123.

S123: If it is determined that the server 110 has the right to execute the management command based on the information on the right stored in the privilege MO, the gateway additionally checks whether the server has the right to execute the management command based on an ACL existing in the terminal 330. To this end, the gateway requests an ACL value used for authenticating the management command to the terminal 330.

S124: The terminal 330 transmits the ACL value used for authenticating the management command to the gateway 220 in response to the request of the gateway 220.

S125: The gateway 220 checks whether the server 110 has the right to execute the management command based on ACL information received from the terminal 330. If it is determined that the server 110 has the right to execute the management command based on the ACL information, the gateway delivers the management command to the terminal 330 in the step S126. If account information of the server 110 does not exist in the terminal 330, right authentication based on an ACL is not available. In this case, it may consider it as authentication is successful and may proceed to the step S126. If it is determined that the server 110 has no right to execute the management command, the gateway 220 can transmit a status code indicating that the server has no right to execute the management command to the server 110.

S126: If the server 110 has the right to execute the management command, the gateway 220 delivers the management command to the terminal 330.

S127: The terminal 330 performs the received management command and delivers a result of processing the management command to the gateway 220.

S128: The gateway 220 can deliver the result of processing the management command received from the terminal in the step S127 to the server 110.

Figure 13:
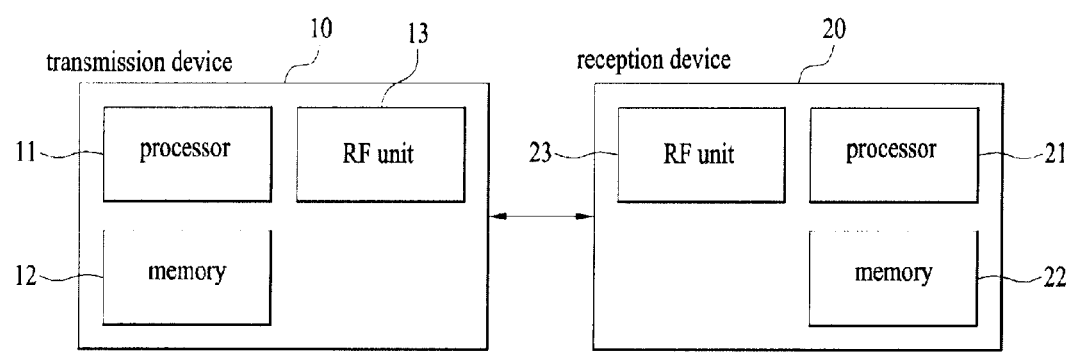
FIG. 13 is a block diagram for a device configured to implement embodiment(s) of the present invention.

FIG. 13 is a block diagram for a device configured to implement embodiment(s) of the present invention. A transmission device 10 and a reception device 20 includes an RF (radio frequency) unit 13/23 configured to transmit or receive a radio signal carrying information and/or data, a signal, a message and the like, a memory 12/22 configured to store various information related to communication in a communication system and a processor 11/21 configured to be operably connected with such a component as the RF unit 13/23, the memory 12/22 and the like, the processor configured to control the memory 12/22 and/or the RF unit 13/23 to enable the corresponding device to perform at least one of the embodiments of the present invention by controlling the components, respectively.

The memory 12/22 can store a program for processing and controlling the processor 11/21 and temporarily store inputted/outputted information. The memory 12/22 can be utilized as a buffer.

The processor 11/21 generally controls overall operation of various modules included in the transmission device or the reception device. In particular, the processor 11/21 can perform various control functions to perform he present invention. The processor 11/21 can be named by such a terminology as a controller, a microcontroller, a microprocessor, a microcomputer or the like. The processor 11/21 can be implemented by hardware, software or a combination thereof. In case of implementing the present invention using hardware, the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays) installed in the processor 11/21. Meanwhile, in case of implementing the present invention using firmware or software, the present invention can be implemented by modules, procedures, and/or functions for performing the above-explained functions or operations included in the firmware or the software. The firmware or the software configured to perform the present invention is installed in the processor 11/21 or stored in the memory 12/22 and can be driven by the processor 11/21.

In embodiments of the present invention, a terminal or a device, a server or a gateway may operate as a transmission device 10 and a DMC, a DMS or a DM gateway may operate as a reception device 20.

Concrete configuration of the reception device and the transmission device can implement items explained by various embodiments of the present invention mentioned earlier with reference to the attached drawings in a manner of being independently applied. Or, two or more embodiments can be applied at the same time.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The present invention can be used for such a wireless communication device as a terminal, a base station, a server and the like.

What is claimed is:

1. A method of managing an access right for a resource of a terminal of a server, which is performed by a gateway device, comprising:
   receiving a management command from a primary server to add or modify a privilege ACL (access control list), in a privilege MO (management object), for a target resource(s) for a secondary server, which has no access right for the target resource(s) of a terminal or a terminal group, wherein the privilege ACL indicates that the secondary server is allowed to have a privilege to access the target resource(s) for at least one of Get, Add, Delete and Replace commands;
   requesting ACL(s) for the target resource(s) to the terminal or each of terminals belonging to the terminal group;
   receiving the ACL(s) for the target resource(s) from the terminal or each of the terminals belonging to the terminal group;
   determining whether or not the primary server has a right to perform the management command based on the received ACL(s); and
   if it is determined that the primary server has the right to perform the management command, adding or modifying the privilege ACL for the target resource(s) in the privilege MO,
   wherein the privilege MO is stored in the gateway device and comprises information on an access right for a target resource of a specific terminal of a specific server.

2. The method of claim 1, wherein the privilege MO comprises a target identifier node indicating an identifier of a terminal or a terminal group corresponding to a target of a specific command, a target type node indicating whether or not the target identifier corresponds to an identifier of a single terminal or an identifier of a terminal group, an URI (uniform resource identifier) node indicating a specific target resource of the terminal or the terminal group to which the specific command is applied and a privilege ACL node indicating an access right for the specific target resource.

3. The method of claim 1, further comprising transmitting a result of processing the management command, which is used for adding or modifying a privilege ACL for a specific target resource of the terminal in the privilege MO, to the primary server.

4. The method of claim 1, wherein the determining whether or not the primary server has the right to perform the management command comprises determining whether or not the primary server has a right to modify the privilege ACL(s) for the target resource(s) received from the terminal or each of the terminals belonging to the terminal group.

5. The method of claim 4, wherein if the primary server does not have the right to modify the privilege ACL for at least one of the target resources received from each of the terminals belonging to the terminal group, it is determined that the primary server has no right to perform the management command.

6. The method of claim 5, further comprising: if it is determined that the primary server has no right to perform the management command, transmitting a result indicating that the management command has failed to the primary server.

7. The method of claim 6, further comprising transmitting an identifier (ID) of a terminal(s), which the primary server has no right to perform the management command, together with the result.

8. The method of claim 1, further comprising: if a management command for the target resource(s) of the terminal or the terminal group is received from the secondary server, authenticating a right of the secondary server based on a privilege ACL for the target resource(s) in the privilege MO.

9. The method of claim 8, wherein the authenticating comprises determining whether or not the secondary server has a right to perform the management command based on the privilege ACL for the target resource(s) in the privilege MO.

10. A gateway device configured to manage an access right for a resource of a terminal of a server, comprising:
   an RF (radio frequency) unit; and
   a processor configured to control the RF unit,
   the processor configured to:
   receive a management command from a primary server to add or modify a privilege ACL (access control list), in a privilege MO (management object), for a target resource(s) for a secondary server, which has no access right for the target resource(s) of a terminal or a terminal group, wherein the privilege ACL indicates that the secondary server is allowed to have a privilege to access the target resource(s) for at least one of Get, Add, Delete and Replace commands,
   request ACL(s) for the target resource(s) to the terminal or each of terminals belonging to the terminal group,
   receive the ACL(s) for the target resource(s) from the terminal or each of the terminals belonging to the terminal group,
   determine whether or not the primary server has a right to perform the management command based on the received ACL(s),
   if it is determined that the primary server has the right to perform the management command, add or modify the privilege ACL for the target resource(s) in the privilege MO,
   wherein the privilege MO is stored in the gateway device and comprises information on an access right for a target resource of a specific terminal of a specific server.

* * * * *